No. 714,537. Patented Nov. 25, 1902.

D. M. WALLACE.

ATTACHMENT FOR OVENS.

(Application filed July 11, 1902.)

(No Model.)

Witnesses
P. F. Nagle.
L. Douville.

Inventor
Dora M. Wallace
By Wedersheim & Fairbank
Attorneys

UNITED STATES PATENT OFFICE.

DORA M. WALLACE, OF GAINESVILLE, FLORIDA, ASSIGNOR OF ONE-HALF TO SARAH C. TAYLOR, OF BAYPORT, FLORIDA.

ATTACHMENT FOR OVENS.

SPECIFICATION forming part of Letters Patent No. 714,537, dated November 25, 1902.

Application filed July 11, 1902. Serial No. 115,169. (No model.)

*To all whom it may concern:*

Be it known that I, DORA M. WALLACE, a citizen of the United States, residing at Gainesville, in the county of Alachua, State of Florida, have invented new and useful Improvements in Attachments for Ovens, of which the following is a specification.

My invention consists of a portable device adapted to be placed in an oven for supporting articles to be baked, roasted, &c., without liability of burning or scorching, while the flavor of the articles will be greatly improved.

Figure 1:
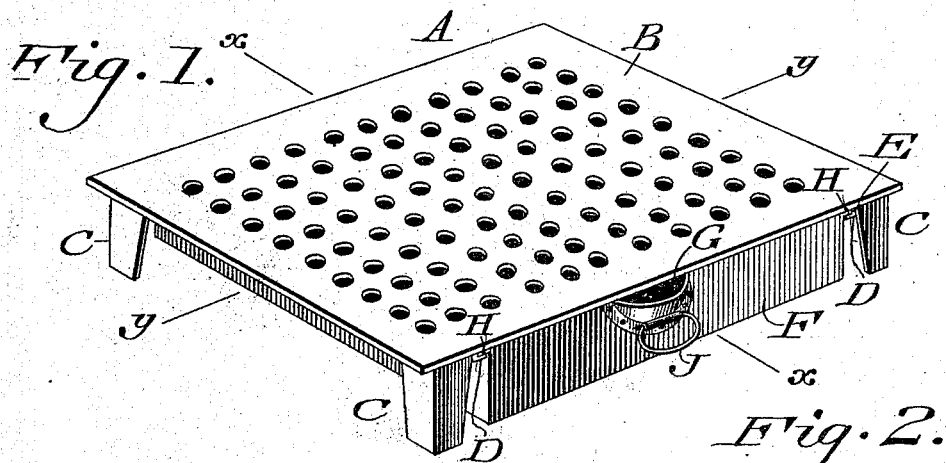
Figure 2:
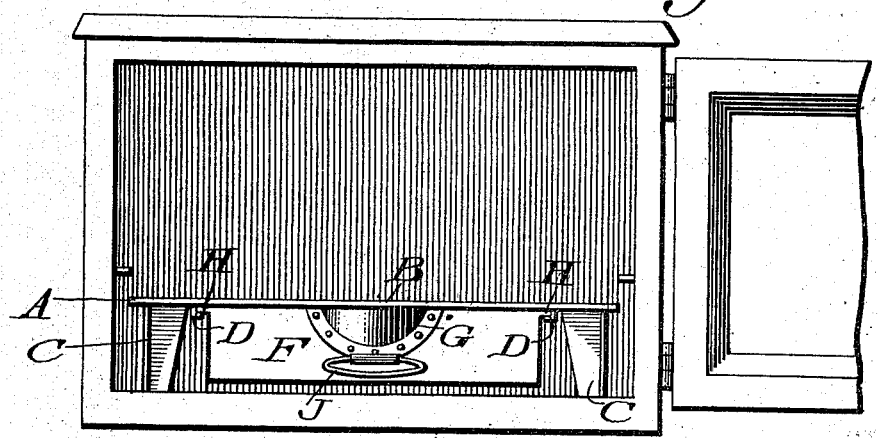
Figure 3:
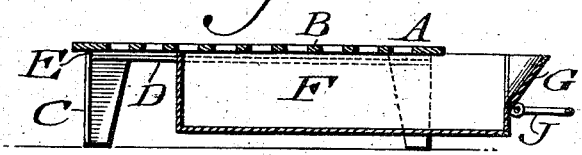
Figure 4:
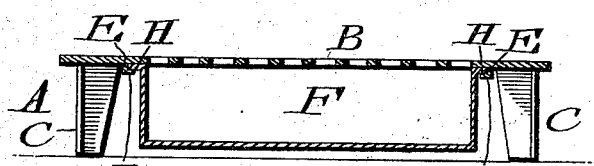

Figure 1 represents a perspective view of an attachment for ovens embodying my invention. Fig. 2 represents a front view thereof, including portion of an oven which receives said attachment. Figs. 3 and 4 represent vertical sections, respectively, on lines $x\,x$ and $y\,y$.

Similar letters of reference indicate corresponding parts in the figures.

Referring to the drawings, A designates a stand formed of the foraminous top plate B, the legs C, and the inturned ways D on the under side of said plate, said ways forming grooves E.

F designates a pan which is open at top and having on its sides, respectively, a spout or lip G, the outwardly-projecting tongues H, and the handle J, it being noticed that said pan is adapted to be fitted under the plate A of the stand and the tongues H rested on the ways D, whereby the pan is suspended from the stand in the space between said legs and may be readily moved out and in.

It will be seen that the device is placed on the floor of an oven and water is poured into the pan through the lip J. An article to be baked, roasted, &c., is then located on the top of the stand and the oven-door closed, when the baking, roasting, &c., may proceed as usual, it being noticed that the pan, dish, &c., containing said article is removed from contact with the floor of the oven, and so the article is prevented from burning or scorching from below, while the water in the pan serves to moisten said article and prevent burning or scorching at the top thereof, while also improving the flavor thereof.

When moisture is not desired and dry heat is required, the pan may be removed and the water poured out at the lip thereof, said lip also providing ready means for replenishing the pan when the latter is within the oven beneath the top plate of the stand.

The top plate of the stand is formed with holes or perforations to permit the vapor from the water in the pan or the heat from the base of the oven to pass therethrough; but it is evident that a gauze or other open material may be employed for the same purpose so long as the same is sufficiently strong to sustain the article to be baked, roasted, &c., placed thereon.

Various changes may be made in the details of construction without departing from the general spirit of my invention, and I do not, therefore, desire to be limited in each case to the same.

Having thus described my invention, what I claim as new, and desire to secure by Letters Patent, is—

1. A portable attachment for an oven consisting of a foraminous top plate, supporting-legs therefor, transversely-extending ways on said plate in the space between said legs and a removable pan depending from said ways and occupying said space.

2. A portable attachment for an oven of the character stated, consisting of a stand having an open top, legs supporting said top, ways on the under side of said top, and a removable pan beneath said top having tongues which are freely mounted on said ways, said pan occupying the space between said legs.

3. In a portable attachment for an oven, a stand having a foraminous top, legs supporting and elevating said top, and a pan movably suspended from said top between said legs and provided with a spout on its side.

4. A portable attachment for an oven consisting of a foraminous top plate, supporting-legs therefor, transversely-extending ways on said plate in the space between said legs and a removable pan depending from said ways and occupying said space and provided with a spout on its side.

DORA M. WALLACE.

Witnesses:
F. STIVENDER,
E. E. VOYLE.